United States Patent
Givon

(10) Patent No.: US 9,251,422 B2
(45) Date of Patent: Feb. 2, 2016

(54) METHODS SYSTEMS APPARATUSES CIRCUITS AND ASSOCIATED COMPUTER EXECUTABLE CODE FOR VIDEO BASED SUBJECT CHARACTERIZATION, CATEGORIZATION, IDENTIFICATION AND/OR PRESENCE RESPONSE

(71) Applicant: Extreme Reality Ltd., Herzliya Pituah (IL)

(72) Inventor: Dor Givon, Tel Aviv (IL)

(73) Assignee: EXTREME REALITY LTD., Herzliya (IL)

( * ) Notice: Subject to any disclaimer, the term of this patent is extended or adjusted under 35 U.S.C. 154(b) by 74 days.

(21) Appl. No.: 14/128,710

(22) PCT Filed: Dec. 31, 2012

(86) PCT No.: PCT/IL2012/050562
§ 371 (c)(1),
(2) Date: Dec. 23, 2013

(87) PCT Pub. No.: WO2013/069023
PCT Pub. Date: May 16, 2013

(65) Prior Publication Data
US 2015/0078616 A1    Mar. 19, 2015

Related U.S. Application Data

(60) Provisional application No. 61/559,090, filed on Nov. 13, 2011.

(51) Int. Cl.
*G06K 9/00* (2006.01)
*G08B 13/196* (2006.01)

(52) U.S. Cl.
CPC ........ *G06K 9/00718* (2013.01); *G06K 9/00342* (2013.01); *G06K 9/00771* (2013.01); *G08B 13/19615* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,665,423 | B1 * | 12/2003 | Mehrotra et al. | 382/107 |
| 7,973,697 | B2 * | 7/2011 | Reilly et al. | 342/22 |
| 8,350,747 | B2 * | 1/2013 | DeLia et al. | 342/22 |
| 8,527,445 | B2 * | 9/2013 | Karins et al. | 706/46 |
| 8,711,217 | B2 * | 4/2014 | Venetianer et al. | 348/143 |
| 8,774,532 | B2 * | 7/2014 | Brown et al. | 382/224 |
| 2004/0161133 | A1 * | 8/2004 | Elazar et al. | 382/115 |
| 2005/0286767 | A1 * | 12/2005 | Hager et al. | 382/190 |
| 2009/0062696 | A1 * | 3/2009 | Nathan et al. | 600/595 |
| 2009/0278937 | A1 * | 11/2009 | Botchen et al. | 348/169 |

* cited by examiner

*Primary Examiner* — Anand Bhatnagar
(74) *Attorney, Agent, or Firm* — Professional Patent Solutions; Vladimir Sherman

(57) ABSTRACT

Disclosed are methods, systems, apparatuses, circuits and associated computer executable code for providing video based subject characterization, categorization, identification and/or presence response. According to some embodiments, there is provided a system including a video acquisition module, a video analytics module to extract subject features and a subject presence response module adapted to generate a response to an identification of a specific subject or group of subjects.

20 Claims, 10 Drawing Sheets

An Image from an Acquired Images Sequence

Human Skeletons Overlaid onto Identified Subjects

An Instance of Skeleton Positions of Subjects Identified In the Image Sequence

METHODS SYSTEMS APPARATUSES CIRCUITS AND ASSOCIATED COMPUTER EXECUTABLE CODE FOR VIDEO BASED SUBJECT CHARACTERIZATION, CATEGORIZATION, IDENTIFICATION AND/OR PRESENCE RESPONSE

FIELD OF THE INVENTION

The present invention relates generally to the field of computing, human-machine interfacing, surveillance, security, media and automated control systems. More specifically, the present invention relates to methods, systems, apparatuses, circuits and associated computer executable code for providing video based subject characterization, categorization, identification and/or presence response.

BACKGROUND

Video based observation of human subjects (subjects) dates back to the 1940's. Computer vision is a field that includes methods for acquiring, processing, analyzing, and understanding images and, in general, high-dimensional data from the real world in order to produce numerical or symbolic information. Image understanding can be seen as the disentangling of symbolic information from image data using models constructed with the aid of geometry, physics, statistics, and learning theory. Applications of computer vision range from tasks such as industrial machine vision systems which can inspect bottles speeding by on a production line, to research into artificial intelligence and computers or robots that can comprehend the world around them. Computer vision and/or derivatives thereof may also be used as part of video based human machine interfacing systems which provide users the ability to control or interact with computerized devices by gesturing while in line-of-sight of a video camera associated with the computerized device. Computer vision and/or derivatives thereof may further be used as part of video surveillance based security systems able to identify individuals and optionally to characterize their activity within a video feed or recording.

Computerized and dynamic control of various aspects and devices associated with a home, premises, facility, perimeter and/or any type of location is desirable. It is further desirable to provide subject specific computerized or automated control of various aspects and devices associated with a home, premises, facility, perimeter and/or any other type of location, such that control of the device or aspect is responsive to an identity or characteristic of a subject or subjects at or in proximity of the home, premises, facility, perimeter and/or any other type of location. It is yet further desirable to provide subject specific computerized or automated control of various security devices associated with a home, premises, facility, perimeter and/or any type of location, such that control or state of the security device is responsive to an identity or characteristic of a subject or subjects at or in proximity of the home, premises, facility, perimeter and/or any other type of location.

SUMMARY OF THE INVENTION

The present invention includes methods, systems, apparatuses, circuits and associated computer executable code for providing video based subject characterization, categorization, identification and/or presence response. According to further embodiments, there may be provided systems adapted to customize a subject's experience based on visually detected features and/or indicators relating to the subject. According to some embodiments, there is provided one or more video acquisition sub-systems which may include cameras, video circuits and ports, and which may be adapted to capture a set of images of a subject (e.g. person, adult, child, etc.). The one or more video acquisition sub-systems may be integral or otherwise functionally associated with a video analytics sub-system, which video analytics sub-system may include various image processing modules, logic and circuits, and which may be adapted to extract, extrapolate or estimate from the acquired set of images one or more visually detectable subject features, static and/or dynamic, such as: height, width, volume, limb sizes, ratio of limb sizes, ratio of limb to torso sizes, angular range of motion between different limbs and limb parts, angular range of motion between limb parts and torso, head size, head movements, hair color and configuration, facial features, clothing type and arrangement, unique wearable accessories. The extracted subject features may be analyzed and characterized/quantified to generate one or more subject indicators or subject parameters indicative of the subject's: (1) age, (2) gender, (3) ethnicity, (4) demographic, (5) physical attributes, (6) motion attributes, (7) physical condition, (8) mental state, (9) and current intention(s). Some indicators or sets of indicators derived from dynamic (motion) features of the subject may include body part motion profiles, combinations of body part motion profiles and derivative thereof including motion frequency coefficients.

A Subject Identification/Categorization Sub-System may be comprised of modules, logic and circuits adapted to receive the extracted subject indicators, access an indicator reference database of subject indictors, and to either identify and/or categorize the subject whose image was present in a video sequence. The identification/categorization sub-system may attempt to correlate the received subject indicators with reference subject/category indicators in the indicator reference database. The reference subject indicators stored in the reference database may be associated with either a specific subject (e.g. individual by the name of Dor Givon) or with one or more groups, types or categories of subjects (e.g. Male, Asian, Adult).

Correlation between a set of received subject indicators and reference indicators stored on the reference database may be absolute or partial. In certain situation, the set of subject indicators received for a subject (individual) being tracked may be smaller than the set of reference indicators stored for that subject in the reference database. In such an event, a partial match between the received indicators and the reference indicators may suffice for an identification or categorization (optionally: only as long as the match between corresponding indicators is sufficiently high). In other cases, the set of subject indicators received for a subject (individual) being tracked may be larger than the set of reference indicators stored for that subject in the reference database. In such an event, once a match between the received indicators and the reference indicators is made (optionally: only when match between corresponding indicators being sufficiently high) and the individual subject is identified, that subject's records in the reference indicator database may be updated to include the new and/or updated subject indicators received from the analytics sub-system.

Based on a subject identification or categorization, a Subject Response Sub-System may alter or trigger one or more of the following: (1) media and/or content being presented at or near a premises, surroundings or perimeter in proximity or otherwise associated with the subject; (2) one or more environmental conditions of the premises, surroundings, perimeter in proximity or otherwise associated with the subject; and (3) a security status or condition of a premises, surroundings or perimeter in proximity or otherwise associated with the subject. Responses to specifically identified subjects or to subject being characterized as belonging to a specific groups or to specific types of subjects may be based on a profile or rule-set stored in a functionally associated response database.

According to some embodiments, visually detected features may be static and/or dynamic features. Any combination of static or dynamic features may be acquired and analyzed to estimate a subject indicator or subject parameter. The acquired static/dynamic features or combination thereof may include the subject's: height, width, volume, limb sizes, ratio of limb sizes, ratio of limb to torso sizes, torso movements, angular range of motion between different limbs and limb parts, angular range of motion between limb parts and torso, head size, head movements, hair color and configuration, facial features, clothing type and arrangement, unique wearable accessories. Any other visually detectable features or combinations of features known today or to be discovered or devised in the future are applicable to the present invention.

Further embodiments of the present invention may include methods, circuits, apparatuses, systems and associated computer executable code for providing video based surveillance, identification and/or categorization of individuals based on visually detectable dynamic features of the subject, such as the subject's motion dynamics. According to some embodiments, spatiotemporal characteristics of an instance of a given individual moving in a video sequence may be converted into: (1) one or more Body Part Specific Motion Profiles (BPSMP), and/or (2) a set of Body Part Specific Frequency Coefficients (BPSFC). Either the BPSMP or frequency coefficients may be stored as subject indicators and used as reference(s) for identifying another instance of the given subject/individual in another video sequence. According to further embodiments, one or more limbs, a torso and optionally the head/neck (referred to as Body Parts) of an individual in a video sequence may be individually tracked while the individual is in motion. Tracking of body part movements may be analyzed and used to generate a motion profile for one or more of the tracked body parts. The body part specific motion profiles may indicate recurring patterns of body part motion while the subject is walking, running or otherwise moving. Additionally, one or more of the motion profiles may be used to generate one or a set of motion related frequency coefficients for each of the tracked body parts. Motion related frequency coefficients associated with a given body part may be referred to as a Body Part Specific Frequency Coefficient, and one or more BPSFC's may be generated for each tracked body part. The one or more BPSFC's for each given tracked limb/torso/head may be indicative of spatiotemporal patterns (e.g. cyclic/repeating movements) present in the given tracked part while the individual subject is in motion, for example during walking or running.

One or an aggregation of body part specific motion profiles BPSMP of an individual (e.g.: (1) right arm, right leg and head; (2) right arm, left arm, left leg and right shoulder) may be stored, indexed, and later referenced as part of a Motion Signature Vector (MSV). Combinations or an aggregation of BPSFC's relating to different body parts of the same given individual (e.g.: (1) right arm, right leg and head; (2) right arm, left arm, left leg and right shoulder) may also be stored, indexed, and later referenced as part of the same or another Motion Signature Vector (MSV) for the same given individual. Accordingly, matches or substantial matches between corresponding BPSMP's and/or BPSFC's of a stored reference MSV and corresponding profiles and/or BPSFC's derived from an individual being video tracked may indicate that the person being video tracked is the same person who was the source of the reference MSV.

Reference BPSMP value ranges and reference BPSFC value ranges, or any combination thereof, may be indicative of a specific subject categorization, including: age ranges, genders, races, etc. Accordingly, an MSV derived from a video sequence of a given subject and including BPSMP values and/or BPSFC values within specific reference ranges defined to be associated with a specific category (e.g. age range, gender, race, etc.) may indicate that the given subject in the video sequence belongs to the specific category (e.g. age range, gender, race, etc.).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
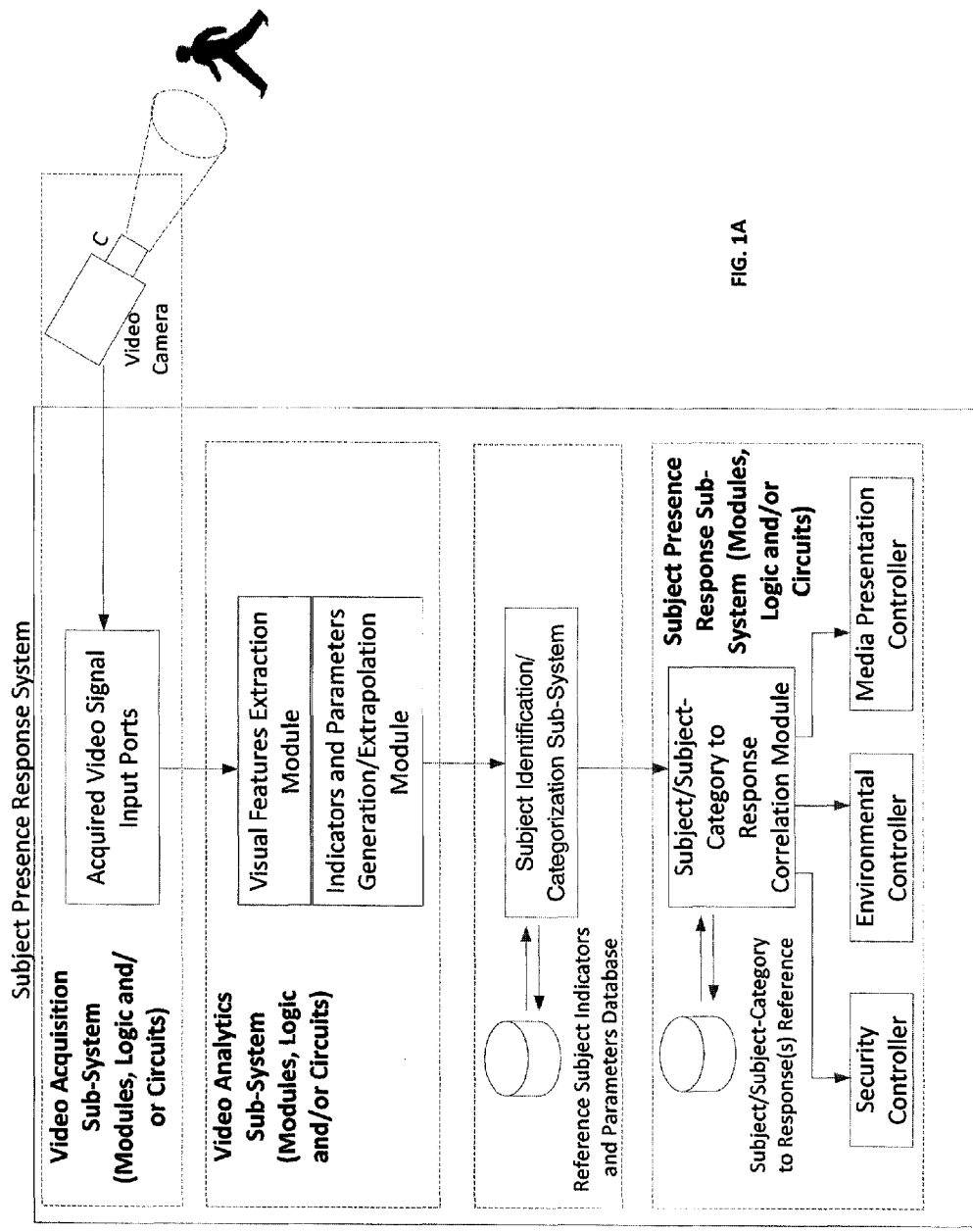
FIG. 1A is a functional block diagram of an exemplary video based Subject Presence Response System (SPRS) according to embodiments including a video acquisition sub-subsystem, video analytics sub-system, a subject or category identification sub-system, and a subject response sub-system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention includes methods, systems, apparatuses, circuits and associated computer executable code for providing video based subject characterization, categorization, identification and/or presence response. According to further embodiments, there may be provided systems adapted to customize a subject's experience based on visually detected features and/or indicators relating to the subject. According to some embodiments, there is provided one or more video acquisition sub-systems which may include cameras, video circuits and ports, and which may be adapted to capture a set of images of a subject (e.g. person, adult, child, etc.). The one or more video acquisition sub-systems may be integral or otherwise functionally associated with a video analytics sub-system, which video analytics sub-system may include various image processing modules, logic and circuits, and which may be adapted to extract, extrapolate or estimate from the acquired set of images one or more visually detectable subject features, static and/or dynamic, such as: height, width, volume, limb sizes, ratio of limb sizes, ratio of limb to torso sizes, angular range of motion between different limbs and limb parts, angular range of motion between limb parts and torso, head size, head movements, hair color and configuration, facial features, clothing type and arrangement, unique wearable accessories. The extracted subject features may be analyzed and characterized/quantified to generate one or more subject indicators or subject parameters indicative of the subject's: (1) age, (2) gender, (3) ethnicity, (4) demographic, (5) physical attributes, (6) motion attributes, (7) physical condition, (8) mental state, (9) and current intention(s). Some indicators or sets of indicators derived from dynamic (motion) features of the subject may include body part motion profiles, combinations of body part motion profiles and derivative thereof including motion frequency coefficients.

A Subject Identification/Categorization Sub-System may be comprised of modules, logic and circuits adapted to receive the extracted subject indicators, access an indicator reference database of subject indictors, and to either identify and/or categorize the subject whose image was present in a video sequence. The identification/categorization sub-system may attempt to correlate the received subject indicators with reference subject/category indicators in the indicator reference database. The reference subject indicators stored in the reference database may be associated with either a specific subject (e.g. individual by the name of Dor Givon) or with a group, type or category of subjects (e.g. Male Asian Adult).

Correlation between a set of received subject indicators and reference indicators stored on the reference database may be absolute or partial. In certain situation, the set of subject indicators received for a subject (individual) being tracked may be smaller than the set of reference indicators stored for that subject in the reference database. In such an event, a partial match between the received indicators and the reference indicators may suffice for an identification or categorization (optionally: only as long as the match between corresponding indicators is sufficiently high). In other cases, the set of subject indicators received for a subject (individual) being tracked may be larger than the set of reference indicators stored for that subject in the reference database. In such an event, once a match between the received indicators and the reference indicators is made (optionally: only when match between corresponding indicators being sufficiently high) and the individual subject is identified, that subject's records in the reference indicator database may be updated to include the new and/or updated subject indicators received from the analytics sub-system.

Based on a subject identification or categorization, a Subject Response Sub-System may alter or trigger one or more of the following: (1) media and/or content being presented at or near a premises, surroundings or perimeter in proximity or otherwise associated with the subject; (2) one or more environmental conditions of the premises, surroundings, perimeter in proximity or otherwise associated with the subject; and (3) a security status or condition of a premises, surroundings or perimeter in proximity or otherwise associated with the subject. Responses to specifically identified subjects or to subjects being categorized as belonging to specific groups or to specific types of subjects may be based on a profile or rule-set stored in a functionally associated response database.

According to some embodiments, visually detected features may be static and/or dynamic features. Any combination of static or dynamic features may be acquired and analyzed to estimate a subject indicator or subject parameter. The acquired static/dynamic features or combination thereof may include the subject's: height, width, volume, limb sizes, ratio of limb sizes, ratio of limb to torso sizes, torso movements, angular range of motion between different limbs and limb parts, angular range of motion between limb parts and torso, head size, head movements, hair color and configuration, facial features, clothing type and arrangement, unique wearable accessories. Any other visually detectable features or combinations of features known today or to be discovered or devised in the future are applicable to the present invention.

Further embodiments of the present invention may include methods, circuits, apparatuses, systems and associated computer executable code for providing video based surveillance, identification and/or categorization of individuals based on visually detectable dynamic features of the subject, such as the subject's motion dynamics. According to some embodiments, spatiotemporal characteristics of an instance of a given individual moving in a video sequence may be converted into: (1) one or more Body Part Specific Motion Profiles (BPSMP), and/or (2) a set of Body Part Specific Frequency Coefficients (BPSFC). Either the BPSMP or frequency coefficients may be stored as subject indicators and used as reference(s) for identifying another instance of the given subject/individual in another video sequence. According to further embodiments, one or more limbs, a torso and optionally the head/neck (referred to as Body Parts) of an individual in a video sequence may be individually tracked while the individual is in motion. Tracking of body part movements may be analyzed and used to generate a motion profile for one or more of the tracked body parts (e.g. BPSFC). The body part specific motion profiles may indicate recurring patterns of body part motion while the subject is walking, running or otherwise moving. Additionally, one or more of the motion profiles may be used to generate one or a set of motion related frequency coefficients for each of the tracked body parts. Motion related frequency coefficients associated with a given body part may be referred to as a Body Part Specific Frequency Coefficient, and one or more BPSFC's may be generated for each tracked body part. The one or more BPSFC's for each given tracked limb/torso/head may be indicative of spatiotemporal patterns (e.g. cyclic/repeating movements) present in the given tracked part while the individual subject is in motion, for example during walking or running.

One or an aggregation of body part specific motion profiles BPSMP of an individual (e.g.: (1) right arm, right leg and head; (2) right arm, left arm, left leg and right shoulder) may be stored, indexed, and later referenced as part of a Motion Signature Vector (MSV). Combinations or an aggregation of BPSFC's relating to deferent body parts of the same given individual (e.g.: (1) right arm, right leg and head; (2) right arm, left arm, left leg and right shoulder) may also be stored, indexed, and later referenced as part of the same or another Motion Signature Vector (MSV) for the same given individual. Accordingly, matches or substantial matches between corresponding BPSMP's and/or BPSFC's of a stored reference MSV and corresponding profiles and/or BPSFC's derived from an individual being video tracked may indicate that the person being video tracked is the same person who was the source of the reference MSV.

Reference BPSMP value ranges and reference BPSFC value ranges, or any combination thereof, may be indicative of a specific subject categorization, including: age ranges, genders, races, etc. Accordingly, an MSV derived from a video sequence of a given subject and including BPSMP values and/or BPSFC values within specific reference ranges defined to be associated with a specific category (e.g. age range, gender, race, etc.) may indicate that the given subject in the video sequence belongs to the specific category (e.g. age range, gender, race, etc.).

Figure 1B:
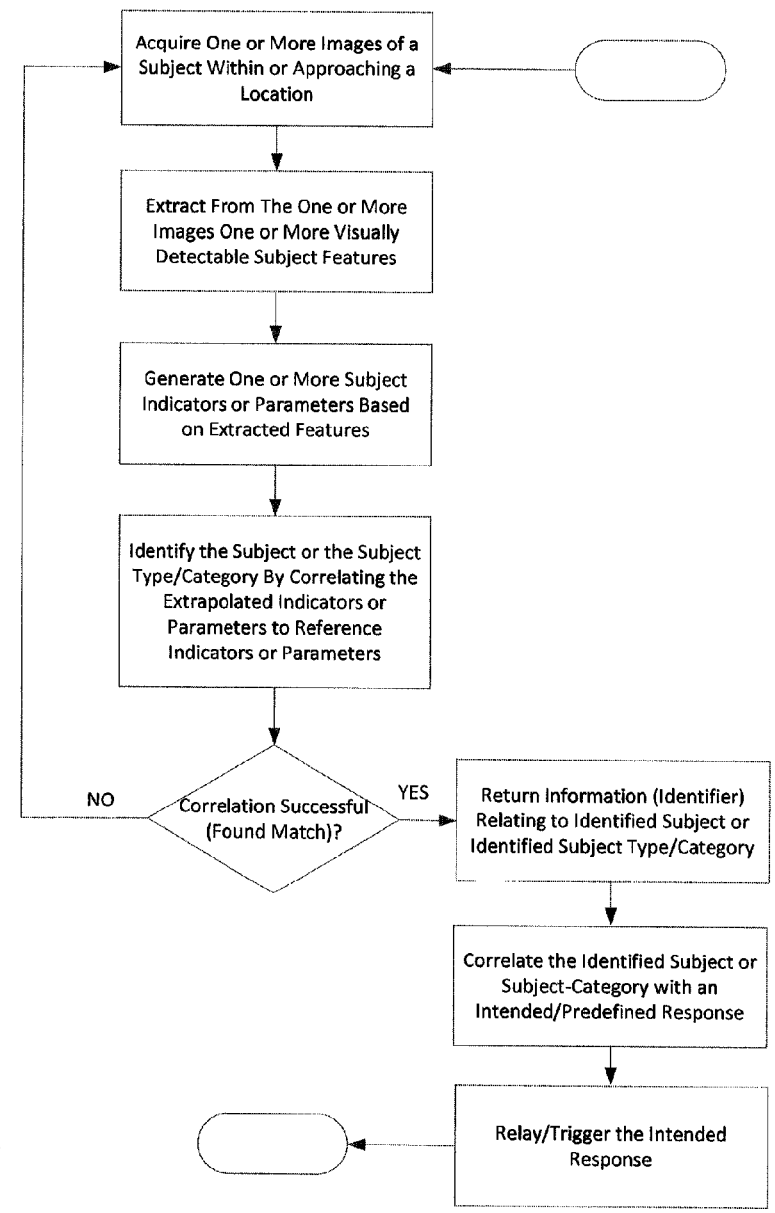
FIG. 1B is a flowchart including the steps of a generic method of operation of a Subject Presence Response System (SPRS) according to embodiments, wherein the generic operation includes video analytics to extract static and/or dynamic visually detectable features of a subject in a video sequence, referencing of a subject/category indicator database in order to identify or categorize the subject, and referencing a subject/category reference database in order to respond to identification or categorization of the subject in an acquired video sequence.

Turning now to FIG. 1A, there is shown a functional block diagram of an exemplary video based subject presence response system according to embodiments including a video acquisition sub-subsystem, video analytics sub-system, a subject or category identification sub-system, and a subject response sub-system. Operation of the system of FIG. 1A may be explained in conjunction with FIG. 1B, which is a flowchart including the steps of a generic method of operation of a Subject Presence Response System (SPRS) according to embodiments, wherein the generic operation includes video analytics to extract static and/or dynamic visually detectable features of a subject in a video sequence, referencing of a subject/category indicator database in order to identify or categorize the subject, and referencing a subject/category reference database in order to respond to identification or categorization of the subject in an acquired video sequence. More specifically, the video analytics sub-system may employ one or a set of image processing algorithms to extract features from one or more frames of a video sequence. Certain algorithms may identify per frame subject features such as head, shoulders, arms, legs, etc. on a frame by frame bases, while other algorithms may track the movement of specific subject features across consecutive frames. Non-motion related subject features may be referred to as static features, while movement related features may be referred to a dynamic features.

The analytics sub-system also includes a subject indicator generation module adapted to analyze one or more static and/or dynamic features of a subject and to quantify the features into one or more subject indicator. A subject identification/categorization sub-system may then use the indicators generated for subject in a video sequence to reference a database include indicator sets associated various individuals and/or various type/categories of individuals. A subject presence response sub-system reference an identified individual subject or category of subjects in a database in order to determine a response to trigger due the subject's presence in the video sequence.

Figure 1C:
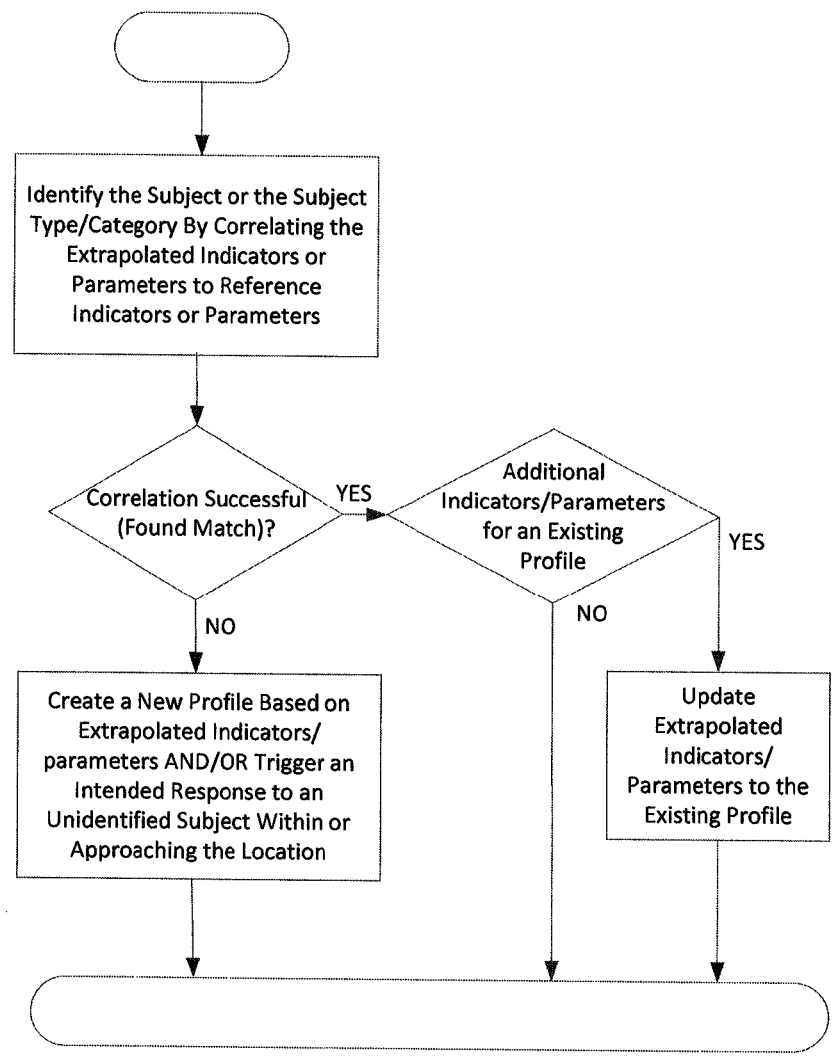
FIG. 1C is a flowchart including the steps of a subject registration method of a Subject Presence Response System (SPRS) according to embodiments, wherein the registration operation includes video analytics to extract static and/or dynamic visually detectable features of a given subject, updating one or more records relating to the given subject with the extracted features, updating one or more records in a subject/type profile database with data indicative of a response to be triggered upon future detection of the given subject.

Turning now to FIG. 1C, there is shown a flowchart including the steps of a subject registration method of a Subject Presence Response System according to embodiments, wherein the registration operation includes video analytics to extract static and/or dynamic visually detectable features of a given subject, updating one or more records relating to the given subject with the extracted features, updating one or more records in a subject/type profile database with data indicative of a response to be triggered upon future detection of the given subject. In situations when indicators derived from a video sequence do not fully correlate or fully match up with reference indicators in a reference data base, the system may either create completely new records for a new individual subject and/or may update or append indicators to an existing subject's records.

Figure 2:
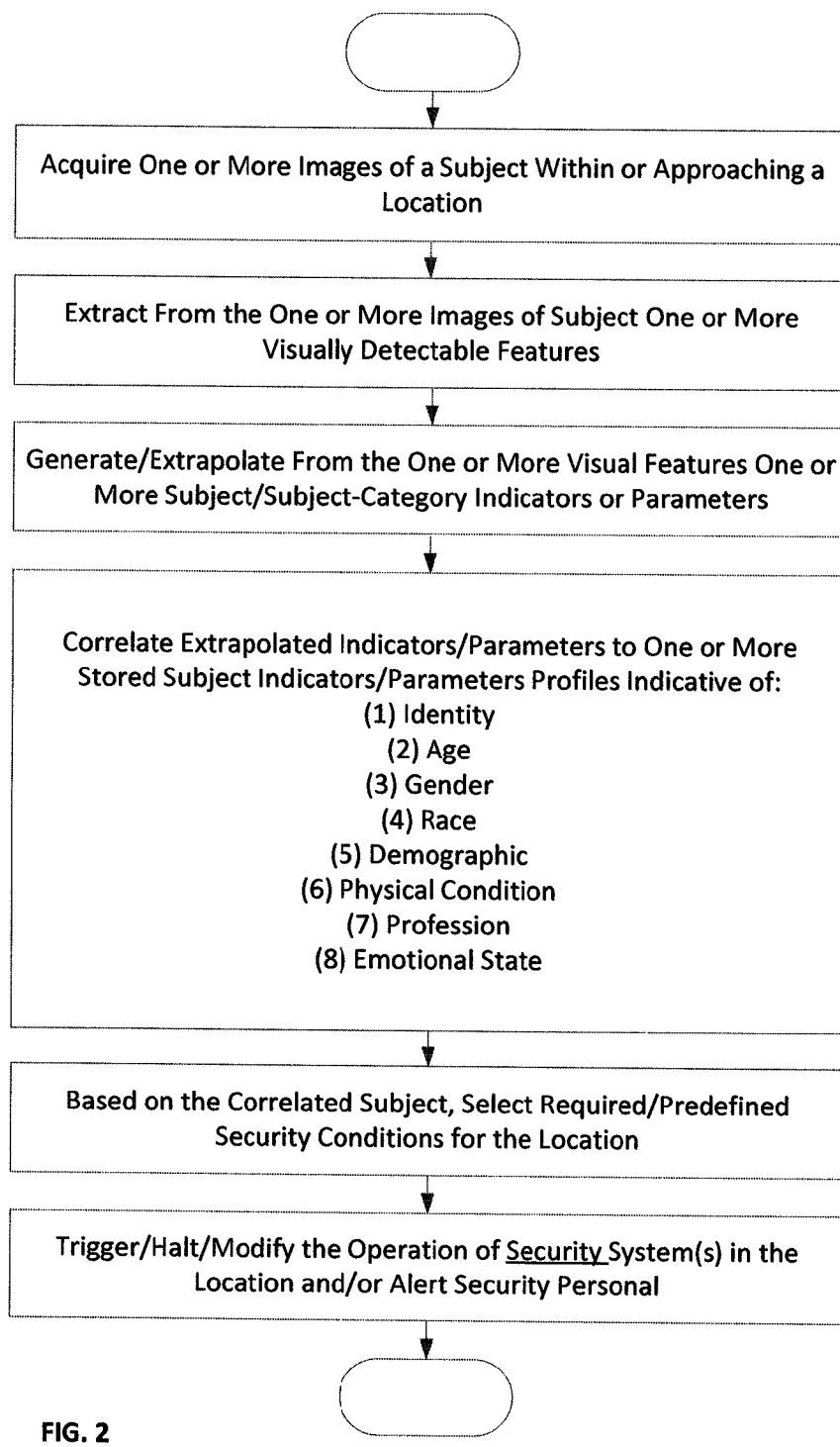
FIG. 2 is a flowchart including the steps of a security related operation of a Subject Presence Response System (SPRS) according to embodiments, wherein the operation includes video analytics to extract static and/or dynamic visually detectable features of a subject in a video sequence, generating subject indicators, referencing of an indicator reference database in order to identify or categorize the subject, and referencing a security profile database in order to respond to identification or categorization of the subject in the acquired video sequence.

Turning now to FIG. 2, there is shown a flowchart including the steps of a security related operation of a Subject Presence Response System (SPRS) according to embodiments, wherein the operation includes video analytics to extract static and/or dynamic visually detectable features of a subject in a video sequence, generating subject indicators, referencing of an indicator reference database in order to identify or categorize the subject, and referencing a security profile database in order to respond to identification or categorization of the subject in the acquired video sequence. Options for responding include: Issuing Alarm Signals, Disabling Alarm Systems, Reconfigure Alarm Systems, Locking or Unlocking doors.

Figure 3:
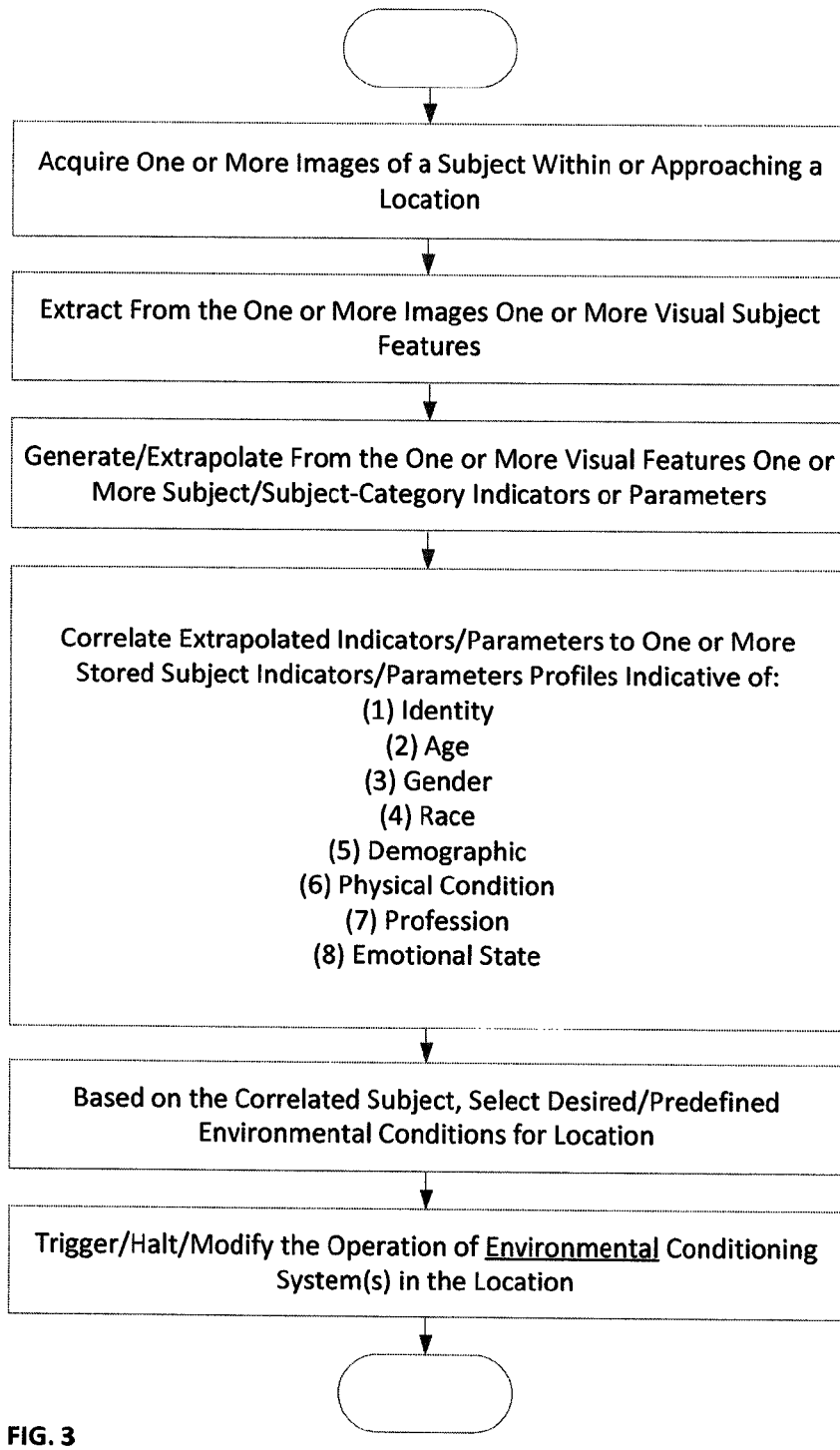
FIG. 3 is a flowchart including the steps of an environmental related operation of a Subject Presence Response System (SPRS) according to embodiments, wherein the operation includes video analytics to extract static and/or dynamic visually detectable features of a subject in a video sequence, generating subject indicators, referencing of an indicator reference database in order to identify or categorize the subject, and referencing a environment profile database in order to respond to identification or categorization of the subject in the acquired video sequence.

Turning now to FIG. 3, there is shown a flowchart including the steps of an environmental related operation of a Subject Presence Response System (SPRS) according to embodiments, wherein the operation includes video analytics to extract static and/or dynamic visually detectable features of a subject in a video sequence, generating subject indicators, referencing of an indicator reference database in order to identify or categorize the subject, and referencing an environment profile database in order to respond to identification or categorization of the subject in the acquired video sequence. According to some embodiments, environmental conditions such as lighting, temperature and/or background music may be triggered and/or altered based on identification of a specific individual who predefined specific environment preferences.

Figure 4:
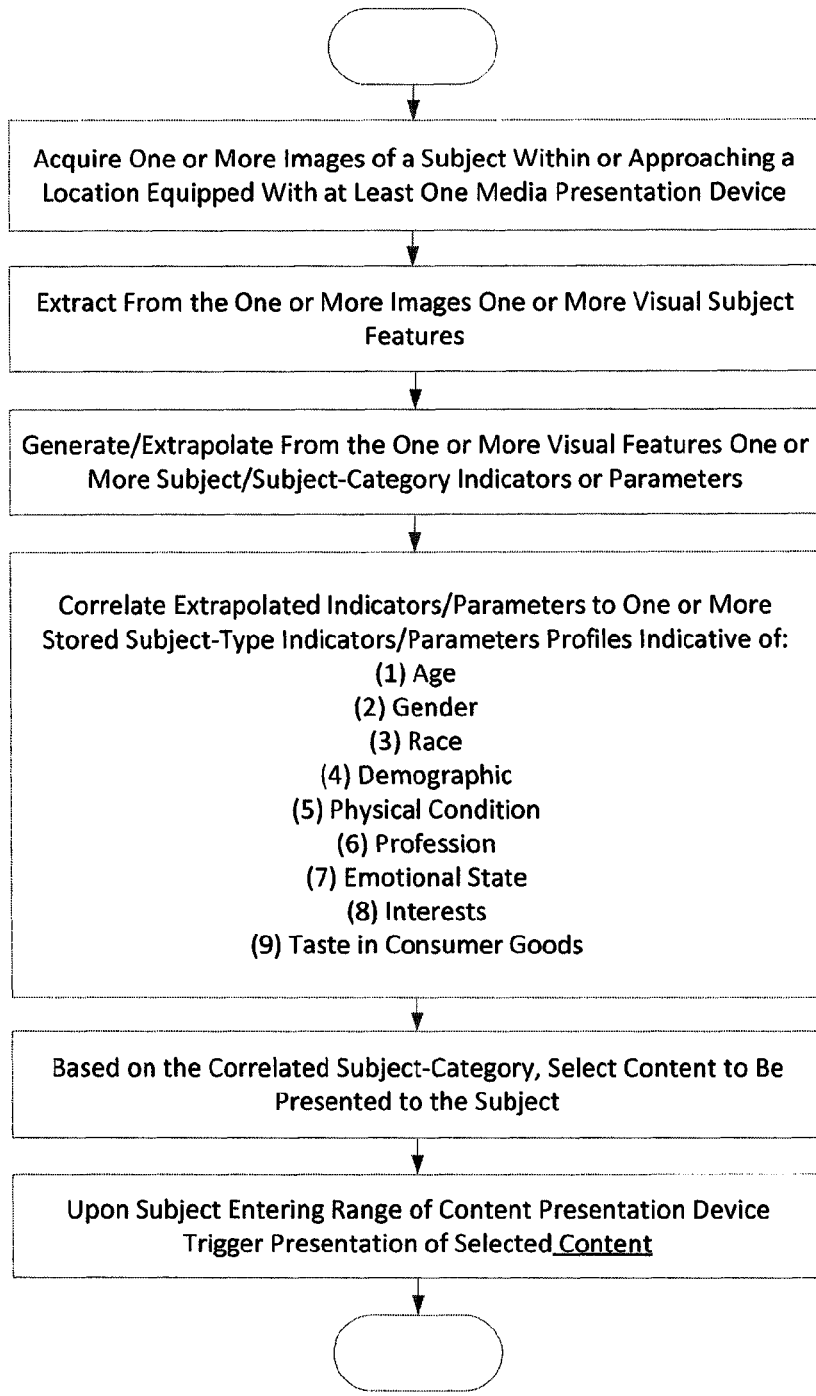
FIG. 4 is a flowchart including the steps of a content presentation related operation of a Subject Presence Response System (SPRS) according to embodiments, wherein the operation includes video analytics to extract static and/or dynamic visually detectable features of a subject in a video sequence, generating subject indicators, referencing of an indicator reference database in order to identify or categorize the subject, and referencing a content profile database in order to respond to identification or categorization of the subject in the acquired video sequence.

Turning now to FIG. 4, there is shown a flowchart including the steps of a content presentation related operation of a Subject Presence Response System (SPRS) according to embodiments, wherein the operation includes video analytics to extract static and/or dynamic visually detectable features of a subject in a video sequence, generating subject indicators, referencing of an indicator reference database in order to identify or categorize the subject, and referencing a content profile database in order to respond to identification or categorization of the subject in the acquired video sequence. According to some embodiments identification of an individual may trigger the presentation of a content predefined by the individual. According to further embodiments, identification of a subject belonging to some type or category of subjects may trigger the presentation of content, such as advertising or notifications, predefined by a third party such as an advertiser.

Figure 5:
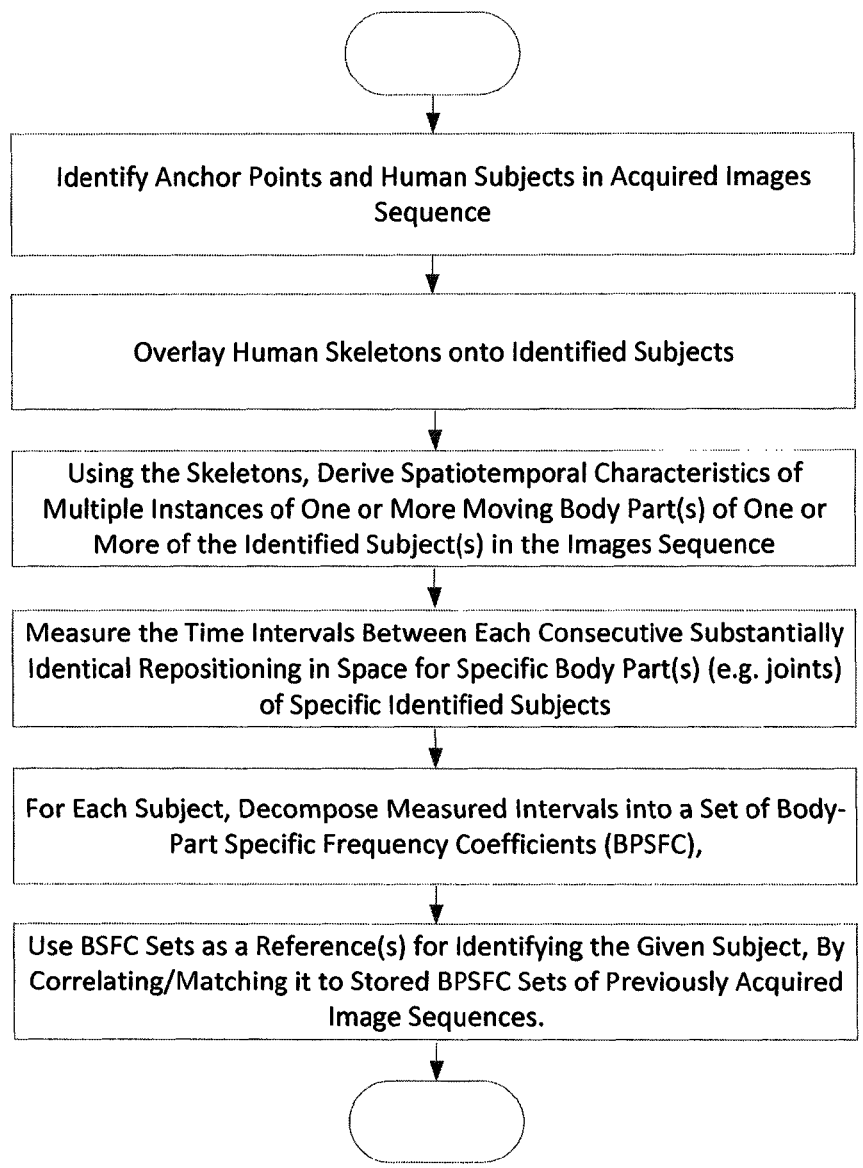
FIG. 5 shows a flowchart including the steps of a process by which: (1) static and dynamic feature may be extracted from a video sequence, (2) subject indicators may be generated and used as or with references indicators in accordance with embodiments of the present invention.
Figure 6A:
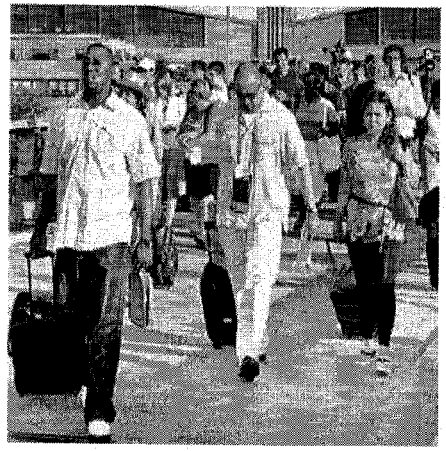
FIGS. 6A-6C show an exemplary series of images illustrating extraction of both static and dynamic subject features from a conventional surveillance video sequence.
Figure 6B:
Figure 6C:
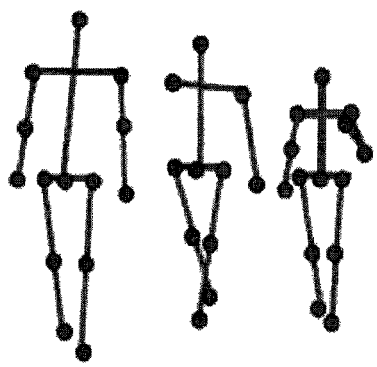
Figure 7:
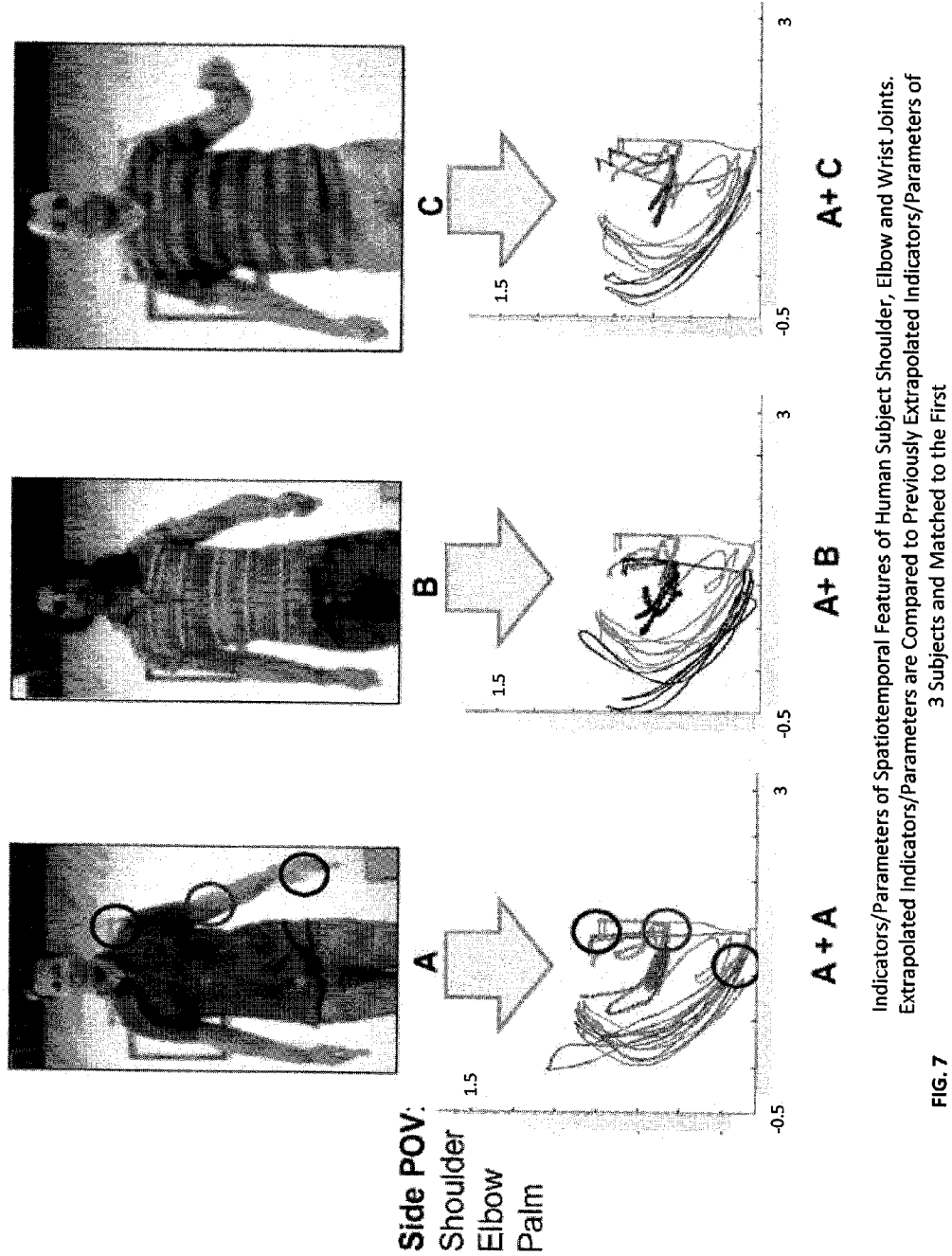
FIG. 7 shows an exemplary series of images illustrating conversion of a conventional video sequence into Body Part Specific Motion Profiles.
Figure 8:
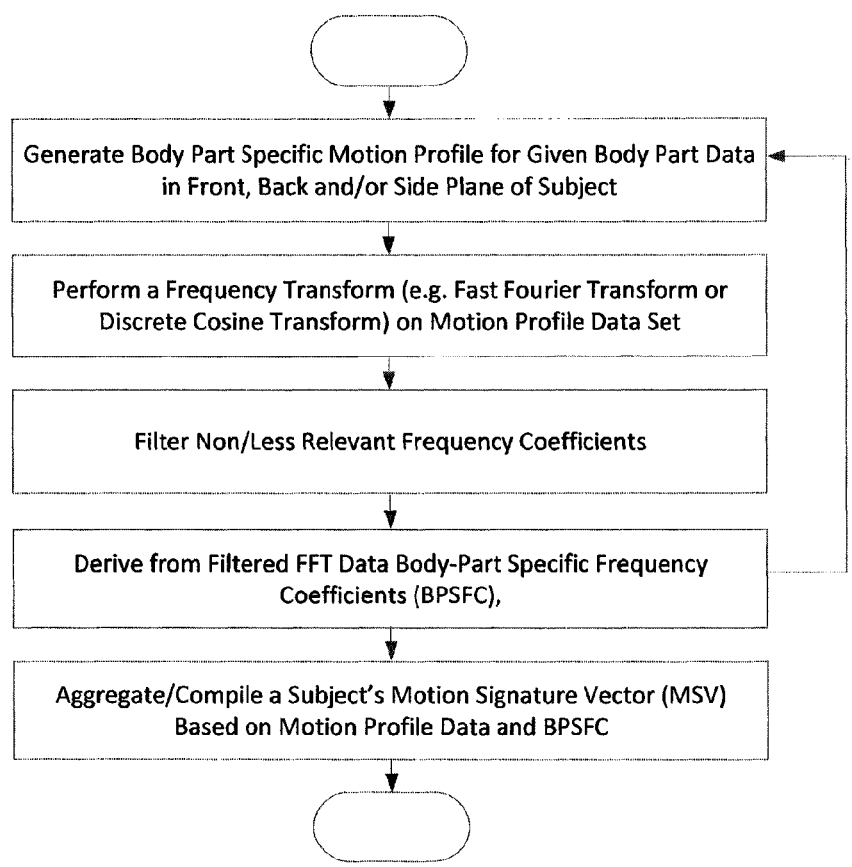
FIG. 8 shows a flow chart including the steps of a process by which body part specific motion profiles may be converted into one or more sets of body part specific frequency coefficients and then aggregated into a Motion Signature Vector MSV for the subject comprised of BPSFC's grouped by body part.

Turning now to FIG. 5, there is shown a flowchart including the steps of a process by which: (1) static and dynamic feature may be extracted from a video sequence, (2) subject indicators may be generated and used as or with references indicators in accordance with embodiments of the present invention. The steps of the FIG. 5 may be explained in conjunction with FIGS. 6A to 6C, which show an exemplary series of images illustrating extraction of both static and dynamic subject features from a conventional surveillance video sequence;

FIG. 7 shows an exemplary series of images illustrating conversion of a conventional video sequence into Body Part Specific Motion Profiles; and FIG. 8 shows a flow chart including the steps of a process by which body part specific motion profiles may be converted into one or more sets of body part specific frequency coefficients and then aggregated into a Motion Signature Vector MSV for the subject comprised of BPSFC's grouped by body part.

According to some embodiments, there is provided a video based subject response system including: (1) a video analytics module to extract subject features from an instance of a subject in a video sequence and to generate one or more subject indicators based on the extracted features; (2) an identification or categorization module adapted to correlate the generated one or more subject indicators with reference indicators in an indicator reference database, wherein specific sets of reference indicators are associated with either a specific subject or with a group of subjects; and (3) a presence response module adapted to generate a system response to an identification of a specific subject or group of subjects. At least one of the indicators may indicate subject motion dynamics. The indicator may include at least one body part specific motion profiles. The indicator may include at least one body part specific frequency coefficients.

According to further embodiments, the system may include a video acquisition sub-system and the presence response module may be adapted to generate signals intended to alter a security condition of location associated with said system. A set of reference indicators may be associated with a specific banned or restricted group or set of subjects.

According to further embodiments, the system may include a video acquisition sub-system and the presence response module may be adapted to generate signals intended to alter an environmental condition of location associated with said system. A set of reference indicators may be associated with a family group member.

According to further embodiments, the system may include a video acquisition sub-system and the presence response module may be adapted to generate signals intended to trigger or alter content presented on a display associated with said system. A set of reference indicators may be associated with a specific demographic of people.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A video based subject response system comprising:
a video analytics module to extract physical parameters of motions of body parts of a human from an instance of the human in a video sequence and to generate one or more subject indicators based on the extracted parameters, which subject indicators are indicative of a characteristic of the human;

an identification or categorization module adapted to identify the human as a specific human or as belonging to a specific group of humans, by correlating the generated one or more subject indicators with a specific set of reference indicators stored in an indicator reference database, which specific set of reference indicators is associated with the specific human or with the specific group of humans, respectively; and a presence response module adapted to generate a system response to the identification of the specific subject or the specific group of subjects.

2. The system according to claim 1, wherein at least one of the indicators indicates motion dynamics of the human.

3. The system according to claim 2, wherein the subject motion dynamics include at least one body part specific motion profile.

4. The system according to claim 2, wherein the subject motion dynamics include at least one body part specific frequency coefficient of movement of the specific body part.

5. The system according to claim 1, further comprising a video acquisition sub-system and wherein said presence response module is further adapted to generate a signal intended to alter a security condition of a location associated with said system.

6. The system according to claim 5, wherein the specific set of reference indicators is associated with a specific banned or restricted group or set of subjects.

7. The system according to claim 1, further comprising a video acquisition sub-system and wherein said presence response module is further adapted to generate a signal intended to alter an environment condition of a location associated with said system.

8. The system according to claim 7, wherein the specific set of reference indicators is associated with a family group member.

9. The system according to claim 1, further comprising a video acquisition sub-system and wherein said presence response module is further adapted to generate a signal intended to trigger or alter content presented on a display associated with said system.

10. The system according to claim 9, wherein the specific set of reference indicators is associated with a specific demographic of people.

11. The system according to claim 1, wherein said identification or categorization module is adapted to perform a partial match between the generated one or more subject indicators and a set of reference indicators.

12. The system according to claim 11, wherein said identification or categorization module is adapted to update or append a set of reference indicators based on a previous identification.

13. A video based subject response system comprising:
a data storage containing profiles of individual humans, which profiles include reference parameters of typical motions of one or more body parts of the respective individual human;

video processing circuitry adapted to identify body parts of a human in a video sequence and extract at least one spatiotemporal parameter of at least one motion of at least one body part of the human;

an identification module, comprising processing circuitry adapted to identify the human as a specific human, by comparing the determined spatiotemporal parameters of the at least one motion of the at least one body part of the human to reference parameters of motions of one or more body parts of the specific human, which reference parameters are stored in a profile of the specific human in said data storage; and a presence response module adapted to generate a system response to the identification of the specific human.

14. The system according to claim 13, wherein the at least one motion is a cyclic motion and the at least one spatiotemporal parameter includes a frequency coefficient of the cyclic motion.

15. The system according to claim 14, wherein the at least one motion is a motion associated with walking.

16. The system according to claim 13, wherein the system response includes activating or altering media content presented on a display or speaker associated with the system.

17. The system according to claim 13, wherein the system response includes altering an environmental condition in proximity to the human.

18. A video based subject response system comprising:
a data storage containing profiles of individual humans or of specific groups of humans, which profiles include reference frequency coefficients of cyclic motions of one or more body parts of the respective individual or group;

video processing circuitry adapted to identify body parts of a human in a video sequence and extract, from the video sequence, spatiotemporal parameters of at least one cyclic motion of at least one body part of the human;

analytic circuitry adapted to calculate a frequency coefficient of the at least one cyclic motion;

an identification module, comprising processing circuitry adapted to identify the human as a specific human or as belonging to a specific group of humans, by comparing the calculated frequency coefficient to a reference frequency coefficient of motions of one or more body parts, stored in said data storage in a profile of the specific human or the specific group, respectively; and a presence response module adapted to generate a system response to the identification of the human.

19. The system according to claim 18, wherein the at least one cyclic motion is a cyclic motion associated with walking.

20. The system according to claim 18, wherein the system response includes altering an environmental condition in proximity to the human.

* * * * *